Patented Sept. 10, 1946

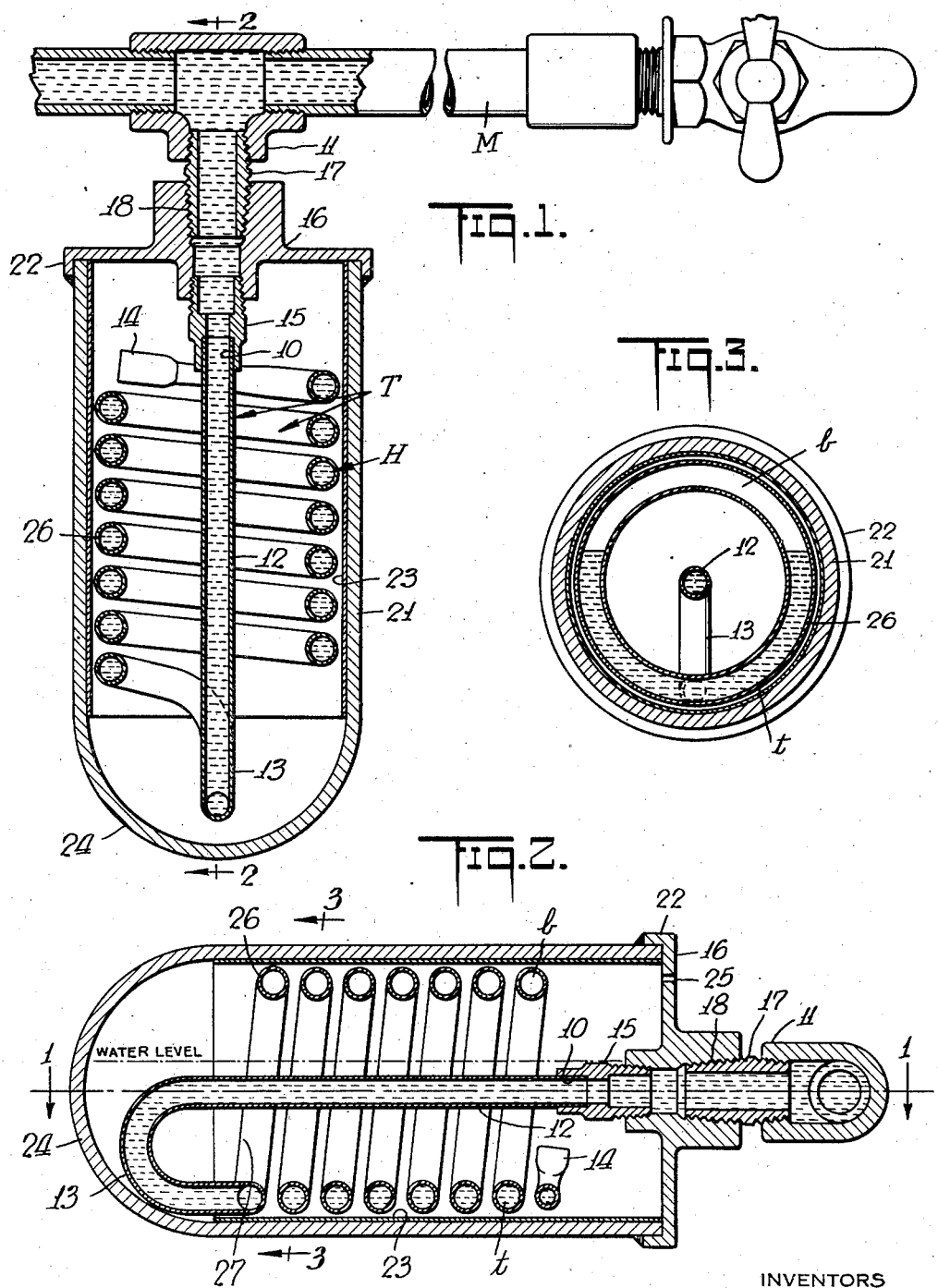

2,407,276

UNITED STATES PATENT OFFICE 2,407,276

SHOCK ABSORBER FOR HYDRAULIC SYSTEMS

Joseph A. Hendel and Michael J. Stupelli, New York, N. Y.

Application January 12, 1943, Serial No. 472,170

6 Claims. (Cl. 138—26)

The present invention relates particularly to the prevention of the destructive strain and the noisy impact commonly called "water hammer" occurring when the outlet of a water pipe discharging under pressure is suddenly closed.

As conducive to a clear understanding of the invention, it is noted that pipes, tubes, or coils tapped into the water line and the walls of which have sufficient rigidity to withstand the punishment to which they are subjected in use will remain efficacious to ease the shock only as long as they contain an adequate amount of air to be compressed under the hydraulic blow occurring when the faucet is quickly shut off. Once the air has substantially been washed out and replaced by water in the course of use, the destructive and annoying water hammer reappears. The use of such system would require repeated plumbing service, which at best would be at intervals of but a few weeks for the purpose of replacing or draining the unit which had become water filled or water logged due to the slow expulsion of air following the release of the pressure absorbed by such unit after each faucet closure.

It is accordingly an object of the present invention to provide a device for alleviating water hammer, which device shall be simple, inexpensive and compact in construction, which shall be easy to install and which shall inherently and effectively maintain trapped therein an adequate amount of air to serve as an efficient shock absorber throughout the life of the water pipe, without any need for service such as replacement or draining or bleeding the water therefrom.

This application is a continuation in part of our copending application, Serial No. 335,226 filed May 15, 1940.

In the accompanying drawing in which is shown one of various possible embodiments of the several features of the invention, Fig. 1 is a sectional view of the installation taken on line 1—1 of Fig. 2 and with parts in plan view, Fig. 2 is a view in longitudinal cross-section through the shock absorber unit taken on line 2—2 of Fig. 1, and Fig. 3 is a transverse sectional view of the unit taken on line 3—3 of Fig. 2.

In a preferred embodiment disclosed, the shock absorber unit of the present invention comprises a tube T desirably of copper to be connected at its inlet 10 to the stem of a T fitting 11 in the water pipe M. Tube T has an inlet length 12 turned into a U-bend 13 at its rear end and the metal beyond the U-bend is coiled into a helical conformation H with a plurality of turns 26 encompassing the inlet length 12 which latter preferably extends axially of said helix. The U-bend 13 desirably extends radially of the helical conformation beyond the end of the latter, but within the cylindrical contour thereof. The innermost end of the helix which is desirably opposite the inlet end 10 of axial pipe or inlet length 12 is constricted or plugged. Desirably, it is pressed closed by flattening as shown at 14 to afford a complete seal at said end.

In a preferred embodiment, the inlet extremity of the coiled unit is brazed or welded into a nipple 15 which is threaded into a cast metal head 16, provided with suitable means for threaded attachment thereof to the stem of the T fitting 11.

A metal bell 21 preferably encloses the helical conformation or coil H to protect the latter from tampering, the rim of said bell being soldered in place within the flange 22 of the head. The bell 21 is of diameter but slightly greater than that of the helical coil and has a liner of yielding paper or asbestos 23 to prevent rubbing or striking of the coil H thereagainst under impact of use. The hollow hemispherical dome 24 of the bell clears the U-bend 13 sufficiently to require no liner.

Desirably, the head or the bell, or both, have a mark such as for instance the aperture 25 in the head 16 which is to be uppermost in the installation, in order to assure that when installed the U-bend 13 extends downward from the horizontally directed inlet length 12, as shown in the drawing.

For practical use in an ordinary apartment or dwelling house installation the helix might have an outer diameter of three inches and have approximately seven turns. The pipe might be $\frac{3}{8}$ inch outer diameter and $\frac{1}{4}$ inch inner diameter. The U-bend 13 could be approximately two and one-half inches long, the over all length of the coil unit being approximately six inches. These dimensions, of course, are not critical but are practically and commercially useful.

The unit is installed as shown in Fig. 1 by mounting its head 16 upon the horizontal stem of T fitting 11 in water pipe M so that the inlet length 12 or axis of the helix will extend substantially horizontally. The mechanical connection may comprise a threaded length of pipe 17 screwed at one end into the stem 11 of the T fitting and at the other end into a threaded socket 18 on the head.

The device is ready for use after the faucet has been opened and quickly closed one or more times. The pressure in the line will thereby cause water to enter and fill the inlet length or axial tube 12 as well as the U-bend 13 and to force its way along the helical turns 26, correspondingly compressing the air therein and mixing therewith. As the pressure in the pipe subsides, much of the air will pass from the unit as the excess water is expelled therefrom under expansion of the compressed air. The shock absorbing coil will thus be partly charged with water as best shown in Fig. 2, the inlet length 12 as well as the U-bend 13 will remain completely filled with water and the trough $t$ of each turn of the helical coil will be filled with water to a level slightly above the axis as shown, the upper portion or crest $b$ of each turn of the helix being filled with air.

In use of the device, the rise of pressure incurred in suddenly closing the faucet from full open position will bring about a surge of water into the coil, which effects a sharp compression of the air in the crests $b$ of the respective turns of the helical coil, the water mixing with the air and effecting considerable turbulence and back and forth movement and the coil itself flexing to some degree. As the pressure subsides the compressed air expands to expel the excess water forced into the unit and returns to crests $b$ of each turn of the helix, back to the normal condition shown in Fig. 2.

The air in the crests $b$ in Fig. 2 remains in the unit indefinitely and will not bleed out or be entrained with shock absorbed water expelled therefrom.

The section of pipe constituting the complete U-bend 13 together with the entry part 27 of the first helical turn is completely filled with water at all times and constitutes a water trap and together with inlet length 12, which is also always water filled, completely precludes the by-passing of any air from the crests $b$ of the individual turns of the helical coil H.

Nor will any air be entrained with the shock absorbed water being expelled from the coil. For in the downward path that such air must follow steeply downwardly through branch 27 of the water trap, the air is released and bubbles upward to the crest of the contiguous turn 26 of the coil H.

Whether or not the foregoing explanation is scientifically complete and correct, the fact is that no air will be expelled from the various crests of the helical turns, which latter serve as air pressure bells, and the turbulence above described has been demonstrated with a full-size glass tube model containing colored liquid in the troughs of its turns and in its water trap and inlet lengths.

If the coil were mounted with the U-shaped bend 13 extending upward rather than downward from the axial inlet length, some of the air from the crest $b$ of the first helical turn which had become mixed with the water forced in upon quick faucet closure, would, in moving upward, escape into the U-bend and therefore be washed out with the expulsion of shock absorbed water from the crest. Very little air would thus escape with each faucet closure and it would take some months before the crest would be sufficiently water-logged to become inoperative as a shock absorber, and to require replacement or draining service.

While the device is thus to be used with the U-bend extending downward and serving as a water trap, it will be understood that the invention embraces within its scope the unit as such, regardless how it be installed. In the less desirable relation just set forth the device, though requiring service every few months, will yet function in manner superior to the prior art known to us.

While the invention is preferably embodied in the simple construction set forth, it may be incorporated in other simple or in more elaborate embodiments, in which an effective water trap is interposed between the inlet and an air bell or air bells and particularly in an embodiment in which the air bells are at the tops of a continuous curved conduit the lower parts of which serve as water troughs, the troughs and bells alternating in tandem or series relation.

As many changes could be made in the above construction, and many apparently widely different embodiments of this invention could be made without departing from the scope of the claims, it is intended that all matter contained in the above description or shown in the accompanying drawing shall be interpreted as illustrative and not in a limiting sense.

Having thus described our invention, what we claim as new and desire to secure by Letters Patent of the United States is:

1. In a water supply system, a shock absorber unit including a helically wound tube sealed at one end and having a U-bend near the other end, extending in a generally radial plane and having a horizontal inlet length connected thereto to be tapped at its extremity into the water line and extending generally axially of the helical tube.

2. A shock absorber unit for a hydraulic system comprising a mounting and inlet head, a tube having a straight inlet run affixed to said head, a U-shaped bend at the end of said straight run, the rest of said pipe comprising a helical length extending from said U-shaped bend and coiled about said inlet length, the extremity of said helical turn being blocked.

3. The combination recited in claim 2 in which the head is provided with an indicator to assist in installing the unit with the U-bend extending downward from the horizontal inlet pipe, to function as a water trap.

4. A shock absorber unit of the character described comprising a circular head, a metal tube having an inlet length connected at one end centrally of said head for communication with the water supply, a U-bend at the free end of said inlet length and a helical conformation extending from said U-bend about said inlet length, the extremity of said helical conformation being blocked, and a closure bell fitted over said coiled metal tube and attached at its rim to said head.

5. The combination recited in claim 4 in which the closure bell is lined with compressible matter which snugly engages the helical tube.

6. The combination recited in claim 4 in which the casing comprising the said head and the said bell has index means to facilitate installation of the unit with the U-shaped length of coil extending downward from the horizontal inlet length, in order to serve as a water trap.

JOSEPH A. HENDEL.
MICHAEL J. STUPELLI.